(12) United States Patent
Ma

(10) Patent No.: US 12,500,760 B2
(45) Date of Patent: Dec. 16, 2025

(54) METHOD, APPARATUS AND DEVICE FOR CONSTRUCTING TOKEN FOR CLOUD PLATFORM RESOURCE ACCESS CONTROL

(71) Applicant: INSPUR SUZHOU INTELLIGENT TECHNOLOGY CO., LTD., Jiangsu (CN)

(72) Inventor: Fuqiang Ma, Shandong (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 255 days.

(21) Appl. No.: 18/246,822

(22) PCT Filed: Sep. 28, 2021

(86) PCT No.: PCT/CN2021/121214
§ 371 (c)(1),
(2) Date: Mar. 27, 2023

(87) PCT Pub. No.: WO2022/121461
PCT Pub. Date: Jun. 16, 2022

(65) Prior Publication Data
US 2023/0370265 A1    Nov. 16, 2023

(30) Foreign Application Priority Data
Dec. 10, 2020 (CN) .................. 202011434899.X

(51) Int. Cl.
*H04L 9/30* (2006.01)
*H04L 9/08* (2006.01)
(Continued)

(52) U.S. Cl.
CPC .............. *H04L 9/30* (2013.01); *H04L 9/0869* (2013.01); *H04L 9/3247* (2013.01); *H04L 63/10* (2013.01)

(58) Field of Classification Search
CPC ............ H04L 63/10; H04L 63/08; H04L 9/50
See application file for complete search history.

(56) References Cited

U.S. PATENT DOCUMENTS 7,409,543 B1 * 8/2008 Bjorn ...................... H04L 9/321
713/168
11,323,454 B1 * 5/2022 Li ....................... H04L 63/0421
(Continued)

FOREIGN PATENT DOCUMENTS

CN     103475666 A    12/2013
CN     103607284 A    2/2014
(Continued)

OTHER PUBLICATIONS

Search report for PCT/CN2021/121214 mailed on Dec. 30, 2021.
Search report for Chinese application 202011434899.X, filed Dec. 10, 2020.

*Primary Examiner* — Kevin Bechtel
*Assistant Examiner* — Aditya Sriram
(74) *Attorney, Agent, or Firm* — Dennemeyer & Associates LLC

(57) ABSTRACT

The present application discloses a method, apparatus and device for constructing a token for cloud platform resource access control. The method includes: acquiring a token application request of an authentication user; according to the token application request, generating an authorization metadata token corresponding to the authentication user; performing digital signature on the authorization metadata token by using a digital certificate, so as to generate a user token; and encrypting the user token by using a user public key, so as to generate an encrypted user token, and sending the encrypted user token and the digital certificate to a client of the authentication user, so that the client performs resource access challenge response by using the authorization metadata token.

18 Claims, 7 Drawing Sheets

(51) Int. Cl.
*H04L 9/32* (2006.01)
*H04L 9/40* (2022.01)

(56) References Cited

U.S. PATENT DOCUMENTS

| | | | | |
|---|---|---|---|---|
| 2001/0021928 | A1* | 9/2001 | Ludwig | G06Q 20/4012 |
| | | | | 707/999.001 |
| 2005/0152542 | A1* | 7/2005 | Zheng | H04L 9/3213 |
| | | | | 380/30 |
| 2006/0184892 | A1* | 8/2006 | Morris | G06F 16/94 |
| | | | | 715/767 |
| 2009/0158392 | A1* | 6/2009 | Hughes | H04L 63/08 |
| | | | | 726/3 |
| 2012/0093312 | A1* | 4/2012 | Gammel | H04L 9/12 |
| | | | | 380/255 |
| 2014/0006777 | A1* | 1/2014 | Amiri | H04L 63/0823 |
| | | | | 713/158 |
| 2014/0082707 | A1* | 3/2014 | Egan | H04L 63/0853 |
| | | | | 726/5 |
| 2014/0282933 | A1* | 9/2014 | Etchegoyen | H04L 63/08 |
| | | | | 726/5 |
| 2014/0304319 | A1* | 10/2014 | Xiao | H04L 41/5058 |
| | | | | 709/203 |
| 2017/0139985 | A1 | 5/2017 | Hahn et al. | |
| 2018/0083960 | A1* | 3/2018 | Sbeiti | H04L 63/0853 |
| 2020/0145403 | A1* | 5/2020 | Chang | G06F 21/6218 |
| 2022/0321357 | A1* | 10/2022 | Omori | H04L 9/3263 |

FOREIGN PATENT DOCUMENTS

| | | |
|---|---|---|
| CN | 104935606 A | 9/2015 |
| CN | 106534175 A | 3/2017 |
| CN | 108599936 A | 9/2018 |
| CN | 108683747 A | 10/2018 |
| CN | 110226177 A | 9/2019 |
| CN | 110445615 A | 11/2019 |
| CN | 111756753 A | 10/2020 |
| CN | 112019343 A | 12/2020 |
| CN | 112671720 A | 4/2021 |

\* cited by examiner

METHOD, APPARATUS AND DEVICE FOR CONSTRUCTING TOKEN FOR CLOUD PLATFORM RESOURCE ACCESS CONTROL

CROSS-REFERENCE TO RELATED APPLICATIONS

This is a 35 U.S.C. 371 National Stage Patent Application of International Application No. PCT/CN2021/121214, filed Sep. 28, 2021, which claims priority to Chinese application 202011434899.X, filed Dec. 10, 2020, each of which is hereby incorporated by reference in its entirety.

FIELD

The present application relates to the technical field of cloud platforms, and in particular, to a method, apparatus and device for constructing a token for cloud platform resource access control.

BACKGROUND

With the development of modern social science and technology, the application of a cloud computing platform (i.e., a cloud platform) is increasingly wider. OPENSTACK, as a cloud computing platform of an open-source infrastructure service, has been widely applied to various cloud computing fields due to the advantages of compatibility, expandability, flexibility and the like. Keystone is an identity authentication component of OPENSTACK. The Keystone provides a unified authorization and identity authentication service for OPENSTACK, is mainly responsible for user information management and authentication service of each service, other core components need to register services thereof in the Keystone, and when a user interacts with a service, the user needs to use the Keystone to perform identity authentication. The security of the component mainly lies in the credibility of authentication, authorization token management and secure communication. Generally, when logging in an OPENSTACK system, the user performs identity authentication through the Keystone, and acquires a token (Token) for accessing other services. The core is that the user obtains an efficient and secure service access token.

The token (Token) in the Keystone is a character string, each Token has a specific access permission range, and the Token may determine a resource that the user may access. If the user uses a user name/password to access an OPENSTACK API (Application Program Interface, application program interface) every time, user information is easily leaked, resulting in potential safety hazards, so that the OPENSTACK requires the user to acquire the Token at first before accessing the API thereof, and then the Token is used as a user credential for access.

In the prior art, the Token utilized by the Keystone has four types: UUID Token, PKI Token, PKIZ Token and Fernet Token. The UUID Token is simple and easy to use, but it does not carry other information, and the OPENSTACK API needs to interact with the Keystone after receiving the Token, so as to verify whether the Token is valid, such that a performance problem is prone to occur under high concurrency; although the PKI token supports local authentication of the remaining service components, a CA (certificate authority) is required to issue a certificate, and a request failure may be caused when the Token is too large; although the PKIZ Token compresses the Token, it also has the defect that the Token is too large; the Fernet Token is a lightweight security message format, although it avoids the problem that the PKI Token is too large, a symmetric encryption key of the Fernet Token for encrypting the Token needs to be distributed, rotated and periodically changed, and the Fernet Token must be verified by the Keystone, such that the performance problem is prone to occur under high concurrency.

SUMMARY

The objective of the present application is to provide a method, apparatus and device for constructing a token for cloud platform resource access control, so as to implement the local authentication of a cloud platform API and improve the expansibility of an identity authentication service on the basis of ensuring the security of identity authentication.

In order to solve the above problems, the present application provides a method for constructing a token for cloud platform resource access control, including:

a token application request of an authentication user is acquired, wherein the authentication user is a user whose identity authentication succeeds, and the token application request includes a user public key;

an authorization metadata token corresponding to the authentication user is generated according to the token application request, wherein the authorization metadata token includes a leaf node of Merkle tree data corresponding to the authentication user, and the leaf node includes a hash value corresponding to each piece of access resource authorization information;

digital signature on the authorization metadata token is performed by using a digital certificate, so as to generate a user token; and the user token is encrypted by using the user public key, so as to generate an encrypted user token, and the encrypted user token and the digital certificate are sent to a client of the authentication user, so that the client performs challenge response of resource access by using the authorization metadata token.

In some embodiments, the leaf node includes: hash values corresponding to information of each endpoint in the cloud platform, user information, project information, role information and authorization time information.

In some embodiments, the information of each endpoint, the user information, the project information, the role information and the authorization time information include respective corresponding random numbers.

In some embodiments, the Merkle tree data is a complete binary tree structure with an even number of leaf nodes.

In some embodiments, in case that the token application request includes a username and a password, the authorization metadata token corresponding to the authentication user is generated according to the token application request includes:

identity authentication is performed on a user corresponding to the token application request according to the username and the password; and in case that the identity verification succeeds, the user corresponding to the token application request is determined to be the authentication user, and the authorization metadata token corresponding to the authentication user is generated.

In some embodiments, in case that the authorization metadata token includes a user ID and the leaf node, digital signature is performed on the authorization metadata token by using the digital certificate, so as to generate the user token includes:

digital signature are respectively performed on the user ID
and the leaf node by using the digital certificate, and
obtained digital signatures are combined to obtain the
user token.

In some embodiments, the authorization metadata token
includes target data in the Merkle tree data; and the target
data only includes the leaf node, and the target data is less
than or equal to 1 KB.

In some embodiments, the method includes:
Merkle tree port data corresponding to each target exposure port is generated according to the Merkle tree data, wherein the target exposure port is an exposure port in the cloud platform to which the authentication user is authorized to access; and
the Merkle tree port data is sent to the corresponding target exposure port for storage.

In some embodiments, in case that the leaf node includes hash value corresponding to information of each endpoint in the cloud platform, the Merkle tree port data includes metadata corresponding to a target leaf node, and non-target leaf nodes, the non-target leaf nodes and the target leaf node form all leaf nodes of the Merkle tree data, the non-target leaf node is a leaf node corresponding to the information of each endpoint other than the corresponding target exposure port in the Merkle tree data, and the metadata is data before hash encryption is performed on the target leaf node in the Merkle tree data.

In some embodiments, the method includes:
a service request of the authentication user for an access exposure port is acquired, which is sent by the client, wherein the access exposure port is an exposure port that receives the service request;
whether the authentication user is valid is verified according to the service request;
in case that the authentication user is valid, challenge information is generated according to the stored target Merkle tree port data, and the challenge information is sent to the client, wherein the target Merkle tree port data is Merkle tree port data, which is stored in the access exposure port and corresponds to the authentication user;
token response information returned by the client is verified according to the target Merkle tree port data; and
in case that the verification succeeds, a service is provided for the client by means of the access exposure port.

In some embodiments, in case that the metadata token includes a user ID, whether the authentication user is valid is verified according to the service request includes:
the user ID is acquired according to a digital signature of the user ID in the service request;
whether the user is valid is verified according to an acquired revocation list and a authorization time information in the metadata; and
in case that the authentication user is valid, the step of generating the challenge information according to the stored target Merkle tree port data, and sending the challenge information to the client is executed.

In some embodiments, the challenge information is generated according to the stored target Merkle tree port data, and the challenge information is sent to the client includes:
a challenge leaf node is randomly selected according to the target Merkle tree port data, challenge information corresponding to the challenge leaf node is generated, and the challenge information is sent to the client, wherein the challenge leaf node is any leaf node of the Merkle tree data.

In some embodiments, in case that the target Merkle tree port data includes a root node of the Merkle tree data, the token response information returned by the client is verified according to the target Merkle tree port data includes:
a response root node is calculated according to a response leaf node and a bypass hash value in the token response information, wherein the response leaf node is any leaf node of the Merkle tree data, the response leaf node corresponds to the challenge leaf node, the bypass hash value is a hash value in the Merkle tree data, which corresponds to the response leaf node and is used for calculating the root node, and the bypass hash value includes a hash value of a leaf node that is not the Merkle tree data;
whether the response root node is the same as the root node is judged; and
in case that the response root node is the same as the root node, the step of providing the service for the client is executed.

In some embodiments, before the step of calculating the response root node according to the response leaf node and the bypass hash value in the token response information, the method includes:
the response leaf node from the authorization metadata token according to the received challenge information is searched by the client;
the bypass hash value is calculated and determined according to the response leaf node and by using the leaf node in the authorization metadata token; and
the token response information is generated according to the response leaf node and the bypass hash value, and the token response information is sent to the access exposure port.

The present application provides an apparatus for constructing a token for cloud platform resource access control, including:
an acquisition component, configured to acquire a token application request of an authentication user, wherein the authentication user is a user whose identity authentication succeeds, and the token application request includes a user public key;
a generation component configured to generate an authorization metadata token corresponding to the authentication user according to the token application request, wherein the authorization metadata token includes a leaf node of Merkle tree data corresponding to the authentication user, and the leaf node includes a hash value corresponding to each piece of access resource authorization information;
a signature component, configured to perform digital signature on the authorization metadata token by using a digital certificate, so as to generate a user token; and
an encrypting and sending component, configured to encrypt the user token by using the user public key, so as to generate an encrypted user token, and send the encrypted user token and the digital certificate to a client of the authentication user, so that the client performs challenge response of resource access by using the authorization metadata token.

The present application provides a device for constructing a token for cloud platform resource access control, including:
a memory, used for storing a computer program; and
a processor used for, when executing the computer program, implementing the steps of the method for constructing the token for cloud platform resource access control as described above.

A method for constructing a token for cloud platform resource access control provided in the present application includes: a token application request of an authentication user is acquired, wherein the authentication user is a user whose identity authentication succeeds, and the token application request includes a user public key; an authorization metadata token corresponding to the authentication user is generated according to the token application request, wherein the authorization metadata token includes a leaf node of Merkle tree data corresponding to the authentication user, and the leaf node includes a hash value corresponding to each piece of access resource authorization information; digital signature is performed on the authorization metadata token by using a digital certificate, so as to generate a user token; and the user token is encrypted by using the user public key, so as to generate an encrypted user token, and the encrypted user token and the digital certificate are sent to a client of the authentication user, so that the client performs challenge response of resource access by using the authorization metadata token.

Therefore, in the present application, by means of setting the authorization metadata token, the encrypted user token, which is sent to the user whose identity authentication succeeds, only needs to contain access resource authorization information required by the service request, so that the length of the token metadata is greatly reduced on the premise of guaranteeing that the information of the token is complete enough, and thus a cloud platform API may perform local authentication by using the content corresponding to the stored token; and moreover, the user token is encrypted by using the user public key, so as to generate the encrypted user token, thereby the security of token transmission is ensured. In addition, the present application provide an apparatus and device for constructing a token for cloud platform resource access control, which also have the above beneficial effects.

BRIEF DESCRIPTION OF THE DRAWINGS

To illustrate embodiments of the present application or in the prior art more clearly, a brief introduction on the drawings which are needed in the description of the embodiments or the prior art is given below. Apparently, the drawings in the description below are merely some of the embodiments of the present application, based on which other drawings may be obtained by those ordinary skilled in the art without any creative effort.

FIG. 10 is a schematic structural diagram of a device for constructing a token for cloud platform resource access control provided in an embodiment of the present application.

DETAILED DESCRIPTION OF THE EMBODIMENTS

In order to make the objectives, advantages of the embodiments of the present application clearer, a clear and complete description of the embodiments of the present application will be given below, in combination with the drawings in the embodiments of the present application. Apparently, the embodiments described below are merely a part, but not all, of the embodiments of the present application. All of other embodiments, obtained by those ordinary skilled in the art based on the embodiments in the present application without any creative effort, fall into the protection scope of the present application.

Figure 1:
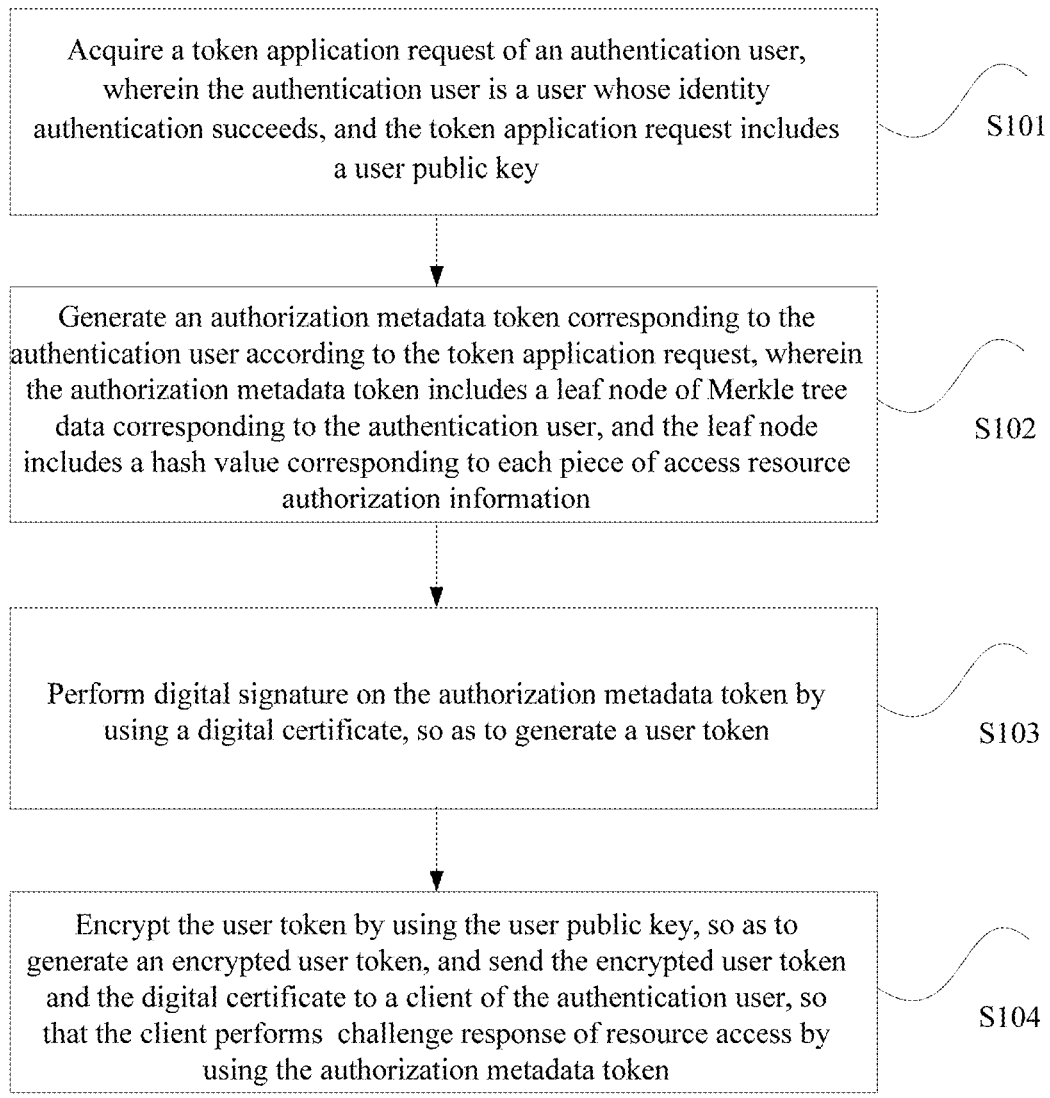
FIG. 1 is a flow diagram of a method for constructing a token for cloud platform resource access control provided in an embodiment of the present application.

Please refer to FIG. 1, FIG. 1 is a flow diagram of a method for constructing a token for cloud platform resource access control provided in an embodiment of the present application. The method may include:

Step 101: a token application request of an authentication user is acquired, wherein the authentication user is a user whose identity authentication succeeds, and the token application request includes a user public key.

The token application request in the present step may be a request, which is sent by the user whose identity authentication succeeds by means of a client and is used for applying for a user token (i.e., User Merkle Tree Token); for example, the User may send a username, a password and public key information (i.e., the user public key) generated by itself by means of an OPENSTACK cloud service system of the client, so as to apply for the user token, that is, the token application request in the present step may include a username, a password and a user public key of the user whose identity authentication succeeds. Correspondingly, in the present step, a processor may perform identity authentication on a user corresponding to the token application request according to the username and the password in the received token application request; in case that the identity verification succeeds, the user corresponding to the token application request is determined to be the authentication user, and step 102 is executed to generate an authorization metadata token corresponding to the authentication user; and in case that the identity verification fails, the present process may be directly ended, or identity authentication failure information is returned to the client.

Correspondingly, the content of the token application request in the present step may be set by a designer himself/ herself according to practical scenarios and user requirements, as long as the processor may determine the user with successful authentication (i.e., the authentication user) who needs to apply for the user token according to the acquired token application request, which is not limited in the present embodiment in any way. Similarly, in the present step, the content of the public key (i.e., the user public key), which is sent by the authentication user in the token application request via the client may be set the design or user himself/ herself, as long as it is ensured that the processor may encrypt the user token that is applied by the authentication user and corresponds to the authorization metadata token by using the user public key, and that the authentication user may decrypt the user token by using a corresponding private key, which is not limited in the present embodiment in any way.

In some embodiments, the present embodiment may include a step of generating the user public key in the token application request and a corresponding private key by the client, for example, the client may automatically and randomly generate public key information (the user public key) and corresponding private key information after acquiring the username and password input by the user, so as to improve the user experience.

In some embodiments, in the present step, a processor in a device (e.g., a server) running an identity authentication service (e.g., Keystone) in the cloud platform (e.g., OPENSTACK) may acquire the token application request of the authentication user, which is sent by the user whose identity authentication succeeds via the client.

Step 102: an authorization metadata token corresponding to the authentication user is generated according to the token application request, wherein the authorization metadata token includes a leaf node of Merkle tree data corresponding to the authentication user, and the leaf node includes a hash value corresponding to each piece of access resource authorization information.

It can be understood that, the objective of the present step may be that, by means of the setting of the leaf node of the Merkle tree data corresponding to the authorization user in the authorization metadata token, the information (i.e., access resource authorization information) of each resource in the cloud platform to which the authentication user is authorized to access is stored by using the leaf node of the Merkle tree data, so as to reduce the length of the token metadata, so that a cloud platform API (e.g., an OPENSTACK API) may perform local authentication by using the content corresponding to the stored token. Access resource authorization information is necessary information required by the service request of the authorization user, for example, information of each endpoint, user information, project information, role information, authorization time information, and the like.

Figure 3:
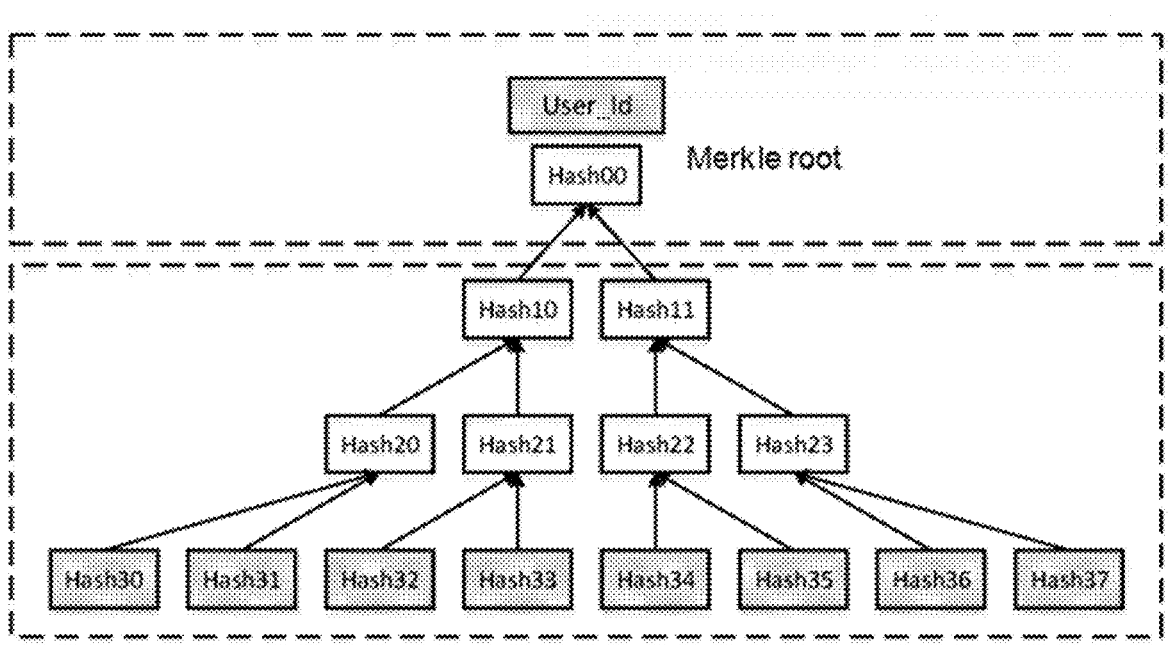
FIG. 3 is a storage schematic diagram of an authorization metadata token of a method for constructing a token for cloud platform resource access control provided in an embodiment of the present application.

In some embodiments, as shown in FIG. 3, the Merkle tree data may be a tree for storing a hash value, the leaf node of the Merkle tree data is a hash value of a data block, and a non-leaf node is a hash value of a series character string of a corresponding child node thereof. In the present step, the endpoint information in the access resource authorization information may be information of an endpoint, that is, an accessible address on a network, which is described by a URL; each service exposes its own API via the endpoint, the client may initiate a service request to the OPENSTACK API by using the endpoint, and an identity authentication service (such as Keystone) of the cloud platform is responsible for managing and maintaining the endpoint of each service. In the present step, the user information in the access resource authorization information may be the information of the authentication user, that is, a digital representation of personal, system or service of the OPENSTACK cloud service; and the authentication user is allocated to a specific project, and is granted with a role and related information, such as a common user, an administrator, a third-party audit and a visitor. The project information in the access resource authorization information may be information of a project corresponding to the authentication user, the project is a container for grouping and isolating resources and the authentication user, and the authentication user must specify the project, so as to send a request to the service. In the present step, the role information in the resource authorization information may be information of a role corresponding to the authentication user, the role includes a group of privileges, which are used for executing a particular operation that may be allocated to a particular user. The authorization time information in the access resource authorization information may be information of an authorization time (Expires_at) corresponding to the authentication user, that is, the information about a usable time of the authorization metadata token.

Correspondingly, in the present embodiment, the content and the number of leaf nodes of the Merkle tree data in the authorization metadata token are not limited, for example, the leaf node of the Merkle tree data may include a hash value corresponding to the information of each endpoint, a hash value corresponding to the user information, a hash value corresponding to the project information and a hash value corresponding to the authorization time information, and the hash value corresponding to each piece of information is stored in a corresponding leaf node; and the leaf node of the Merkle tree data may include a hash value corresponding to creation time information (Issued_at).

In some embodiments, in order to improve the security, a random number (e.g., a random number of one byte) may be added into each piece of the information of each endpoint, the user information, the project information, the role information, the authorization time information and the creation time information, so as to resist an exhaustive attack, and the leaf node of the Merkle tree data may include hash values corresponding to the above pieces of information added with the random numbers, respectively.

Correspondingly, in the present step, the leaf nodes of the Merkle tree data in the authorization metadata token may be disordered, that is, when the authorization metadata token is generated each time, the positions of the above pieces of information in the leaf nodes of the Merkle tree data may be different, that is, the information of each endpoint, the user information, the project information, the role information, the authorization time information and the creation time information have no fixed arrangement sequence, and the processor may generate the Merkle tree data by using, as the leaf nodes of the Merkle tree, hash values corresponding to the information of each endpoint, the user information, the project information, the role information, the authorization time information and the creation time information, respectively. That is to say, if a new authorization metadata token needs to be generated for the same user again, even if the previous access permission is not changed, the sequence of the leaf nodes of the Merkle tree data in the new authorization metadata token is different from that in the old authorization metadata token, that is, the new authorization metadata token cannot be speculated from the old authorization metadata token.

In some embodiments, in the present embodiment, the length of the leaf node of the Merkle tree data, that is, the length of the hash value, is not limited, for example, the length of the hash value of the leaf node of the Merkle tree data in the present step may be 32 bytes, or may be a smaller number of bytes, the data volume is reduced by reducing the byte length of the hash value, but the corresponding degree of security is reduced accordingly.

Figure 2:
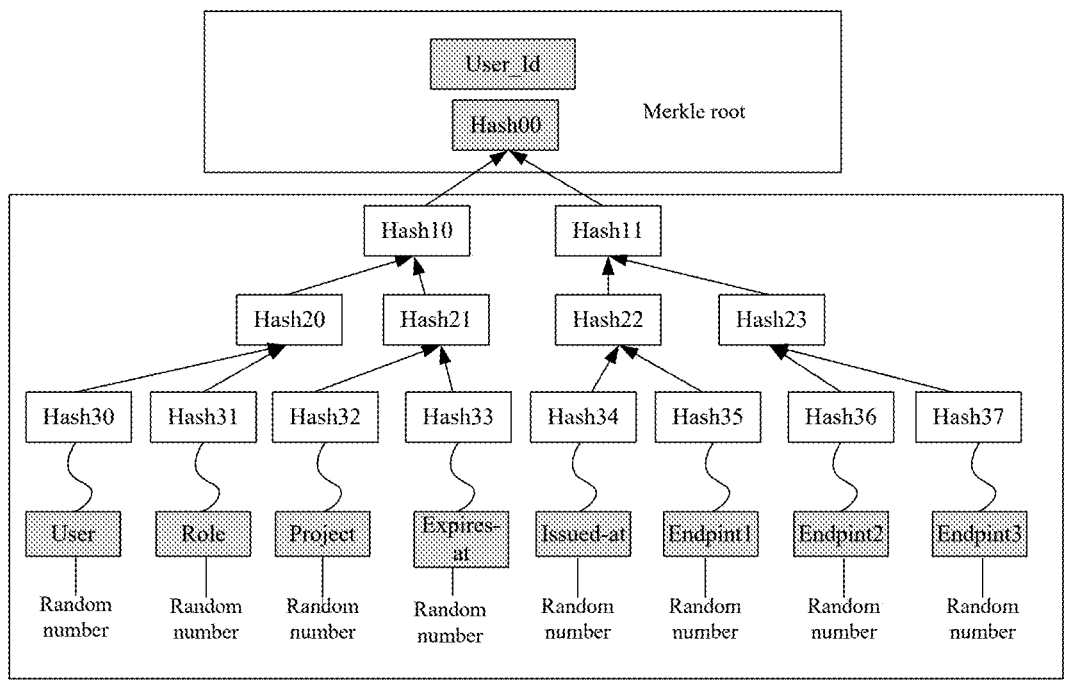
FIG. 2 is a storage schematic diagram of a Merkle tree token of a method for constructing a token for cloud platform resource access control provided in an embodiment of the present application.

It should be noted that in the present step, a Merkle tree (i.e., the Merkle tree data) corresponding to the leaf node in the authorization metadata token may be obtained by calculating hash layer by layer from bottom to top starting from the leaf node to a root node (a Merkle root, e.g., Hash00 in FIG. 2). Correspondingly, the Merkle tree data in the present step may be a complete binary tree structure with an even number of leaf nodes, that is, when necessary information required by service requests, that is, the endpoint information, the user information, the project information, the role information, the authorization time information and the creation time information, is in an odd number, the processor may then generate a corresponding number of leaf nodes, so as to ensure that the Merkle tree data is the complete binary tree structure with the even number of leaf nodes, for example, the processor may randomly copy the data of one leaf node and fill the tail with the data.

In some embodiments, the content of the authorization metadata token in the present step may be set by the designer himself/herself, for example, the authorization metadata token may only include the leaf node of the Merkle tree data; the authorization metadata token may also include a user ID (e.g., User_ID in FIG. 3) and leaf nodes (Hash30-Hash37) of the Merkle tree data; and the metadata token may include other information of the user, which is not limited in the present embodiment in any way.

Correspondingly, as shown in FIG. 2, the present step may include a step of storing, by the processor, a Merkle tree token (e.g., a Keystone Merkle Tree Token) corresponding to a user authentication service, wherein in case that the authorization metadata token includes the user ID and the leaf node of the Merkle tree data, the Merkle tree token may include the user ID and metadata corresponding to each leaf node in the Merkle tree data, that is, the user ID and data before the hash of each leaf node is encrypted, as shown in FIG. 2, User, Role, Project, Expires_at, Issued_at and information of each endpoint (Endpoint 1 to Endpoint 3) with the respective corresponding random numbers added; and the Merkle tree token may include a root node (e.g., Hash00 in FIG. 2) in the Merkle tree data.

Step 103: digital signature on the authorization metadata token is performed by using a digital certificate, so as to generate a user token.

It can be understood that, the objective of the present step may be that the processor performs digital signature on the authorization metadata token by using the digital certificate, and encrypts the authorization metadata token by using the digital signature, so as to ensure the transmission security of the authorization metadata token.

Correspondingly, when the authorization metadata token includes the user ID and the leaf node of the Merkle tree data, in the present step, the processor may respectively perform digital signature on the user ID and the leaf node (hash value) by using the digital certificate, and combine the two portions to form a user token (User Merkle Tree Token).

In some embodiments, as shown in FIG. 3, when the Merkle tree data is a complete binary tree structure with an even number of leaf nodes, a json (a lightweight data exchange format) expression of the metadata of the user token (User Merkle Tree Token) may be:

"User_Id": 3ec3164f750146be97f21559ee4d9c51, "Hash00":Merkle root, [{[{[{["Hash30":User]}, {["Hash31":Role]}]}, {[{["Hash32":Project]}, {["Hash33":Expires-at]}]}, {[{[{["Hash43": Issued-at]}, {["Hash35":Endpoint1]}]}, {[, {["Hash36":Endpoint2]}, {["Hash37": Endpoint3]}]}]}

Step 104: the user token is encrypted by using the user public key, so as to generate an encrypted user token, and the encrypted user token and the digital certificate are sent to a client of the authentication user, so that the client performs challenge response of resource access by using the authorization metadata token.

In the present step, the processor encrypts the user token by using the user public key, which is sent by the user via the client, thereby the transmission security of the user token is ensured; and in the present step, the processor sends the encrypted user token and the digital certificate to the client, so that the user may perform corresponding decryption on the encrypted user token by using the digital certificate and a private key corresponding to the user public key of the user, so as to obtain the authorization metadata token, and accordingly, when the service request is performed, resource access challenge response might be performed by using the authorization metadata token obtained by decryption.

Correspondingly, after the present step, the method may include a step of decrypting, by the client, the encrypted user token by using the private key corresponding to the user public key, so as to obtain the user token; and verifying a digital signature in the user public key by using the digital certificate, and acquiring the authorization metadata token.

It should be noted that, in the present embodiment, the process of a user for applying for, by means of the client, a token (i.e., the user token) from a device (e.g., a server) running an identity authentication service (e.g., Keystone) in the cloud platform is shown as an example, and correspondingly, the process of other users for applying for tokens from the device by means of other clients may be implemented in the same or similar manner as the method provided in the present embodiment, which is not limited in the present embodiment in any way.

Correspondingly, the present embodiment may include a step of storing, by the processor, corresponding Merkle tree port data of a cloud platform API (e.g., OPENSTACK API) of an exposure port (i.e., a target exposure port) corresponding to the authentication user in the cloud platform, so that when the client sends a resource access service request to the cloud platform API of the target exposure port, the cloud platform API may use the stored Merkle tree port data to challenge the authentication user. That is to say, the cloud platform API of each exposure port (i.e., the target exposure port) in the cloud platform to which the authentication user is authorized to access may determine the access permission of the authentication user by using the Merkle tree port data stored therein, and an exposure port (i.e., a non-target exposure port) to which the authentication user is not authorized to access does not store the Merkle tree port data corresponding to the authentication user, so that it may be determined that the authentication user does not have the permission to access the non-target exposure port. Correspondingly, the method provided in the present embodiment may include: Merkle tree port data corresponding to each target exposure port is generated by the processor according to the Merkle tree data corresponding to the authentication user; and the Merkle tree port data is sent to the corresponding target exposure port for storage, wherein the target exposure port is an exposure port in the cloud platform to which the authentication user is authorized to access.

Figure 4:
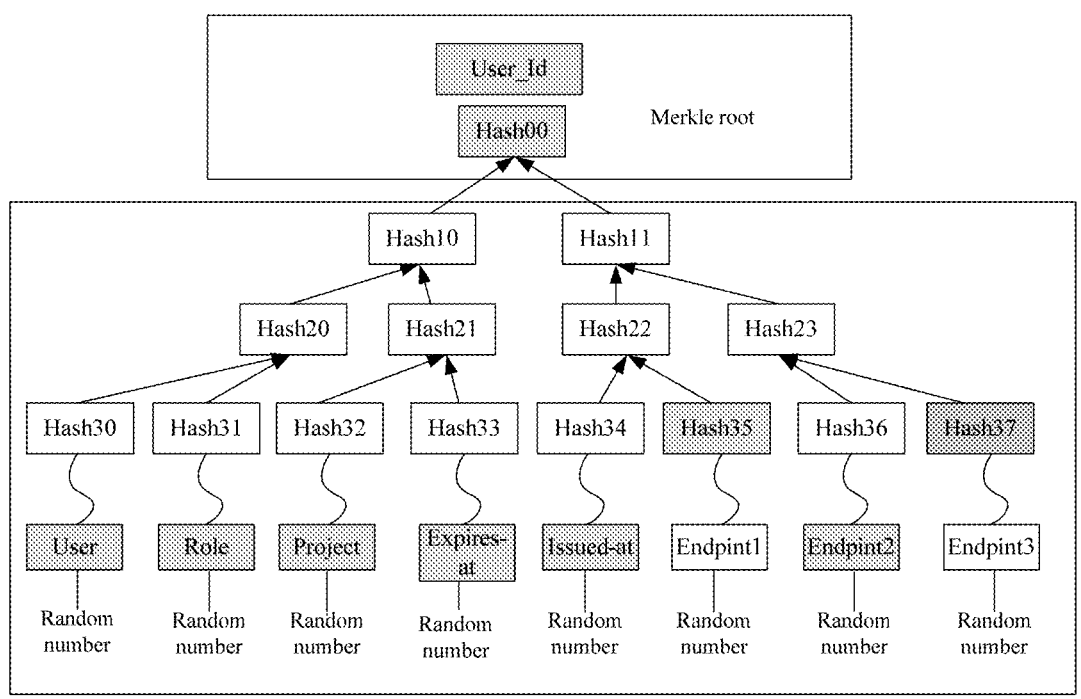
FIG. 4 is a storage schematic diagram of Merkle tree port data of a method for constructing a token for cloud platform resource access control provided in an embodiment of the present application.

In some embodiments, the stored Merkle tree port data corresponding to the exposure port (i.e., the cloud platform API) in the cloud platform to which the authentication user is authorized to access may include metadata corresponding to a target leaf node and non-target leaf nodes; as shown in FIG. 4, when the leaf node in the Merkle tree data corresponding to the authentication user includes a hash value corresponding to the information of each endpoint in the cloud platform, the non-target leaf nodes are leaf nodes (e.g., Hash35 and Hash37 in FIG. 4) corresponding to the information of each endpoint other than the corresponding target exposure port (e.g., Endpoint 2 in FIG. 4) in the Merkle tree data, and the metadata corresponding to the target leaf node may be data before hash encryption is performed on each leaf node (i.e., the target leaf node) other than the non-target leaf nodes in the Merkle tree data, for example, User, Role, Project, Expires_at, Issued_at and Endpoint 2 with the respective corresponding random numbers added, as shown in FIG. 4.

in the present embodiment, the problem that the length of the existing PKI Token message is too large is solved, the PKI Token easily reaches 8 KB, so that the Token is difficult to adapt to an HTTP message header. In the present embodiment, by means of constructing the authorization metadata token and performing a hash operation on corresponding data, the length of the token message is reduced, and sufficient and efficient verification data is ensured; the client only needs to store the user token or the authorization metadata token of 256 k to 1 KB, that is, the authorization metadata token may include target data in the Merkle tree data, the target data may only include all leaf nodes of the Merkle tree data, and the target data may be less than or equal to 1 KB; and the server only needs to store about 2 KB of Merkle tree port data corresponding to the cloud platform API of each target exposure port.

In the present embodiment, by means of setting the authorization metadata token in the embodiments of the present application, the encrypted user token, which is sent to the user whose identity authentication succeeds, only needs to contain access resource authorization information required by the service request, so that the length of the token metadata is greatly reduced on the premise of guaranteeing that the information of the token is complete enough, and thus the cloud platform API may perform local authentication by using the content corresponding to the stored token; and moreover, the user token is encrypted by using the user public key, so as to generate the encrypted user token, thereby ensuring the security of token transmission.

Figure 5:
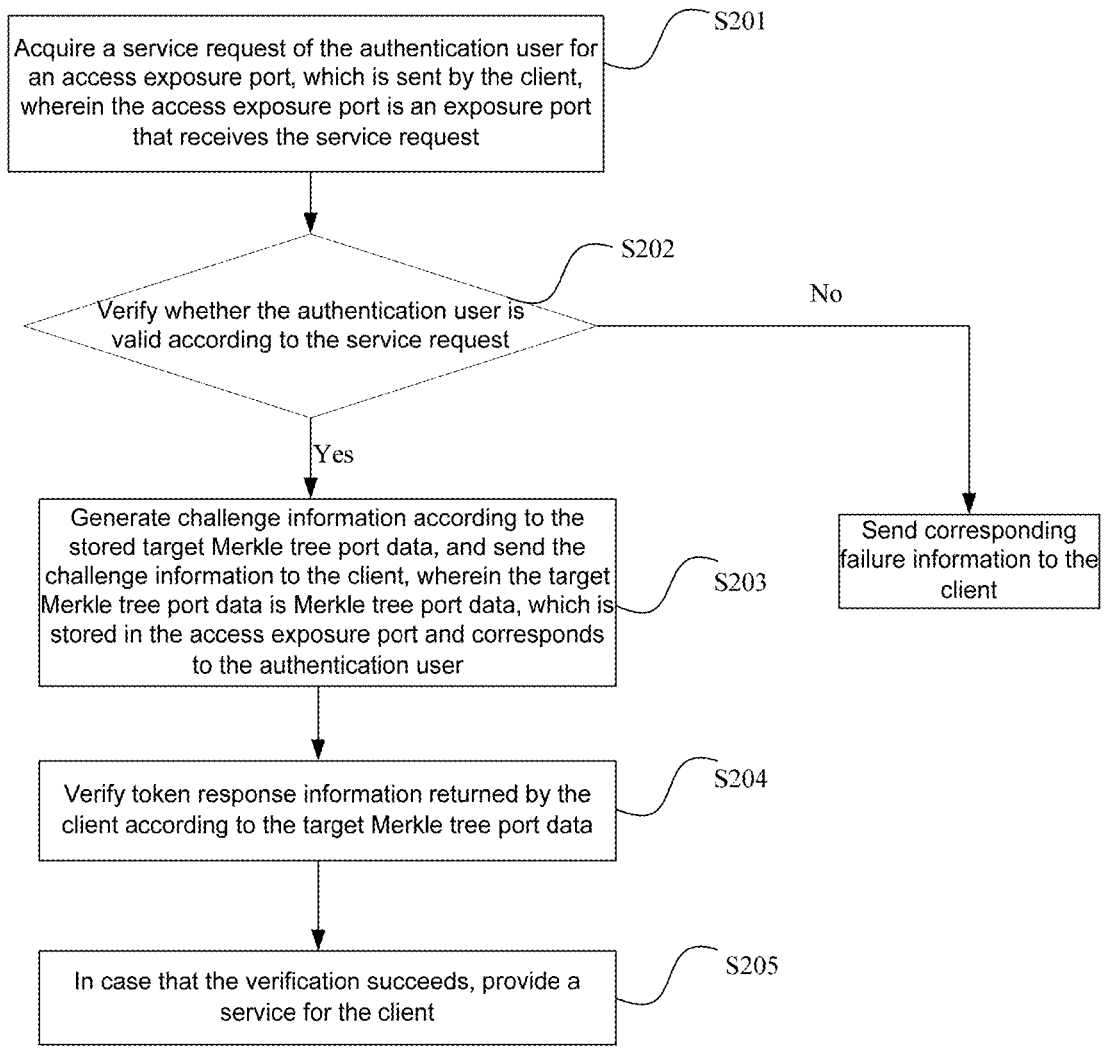
FIG. 5 is a flow diagram of a service request process of a method for constructing a token for cloud platform resource access control provided in an embodiment of the present application.

Based on the previous embodiment, the present embodiment discloses a use process of a constructed token (i.e., the encrypted user token) for cloud platform resource access control. In some embodiments, please refer to FIG. 5, FIG. 5 is a flow diagram of a service request process of a method for constructing a token for cloud platform resource access control provided in an embodiment of the present application. The method may include:

Step 201: a service request of the authentication user for an access exposure port is acquired, which is sent by the client, wherein the access exposure port is an exposure port that receives the service request.

In some embodiments, the present embodiment may be a process in which the user initiates, via the client, the service request to the cloud platform API (e.g., the OPENSTACK API) of the exposure port after acquiring an encrypted user instruction via the client. In the present embodiment, a server, which provides the cloud platform API in the cloud platform, performs local authentication by using the stored Merkle tree port data (e.g., OPENSTACK API Merkle Tree Token), without performing online communication with the component of the identity authentication service (e.g., Keystone), thereby reducing communication overheads.

Figure 6:
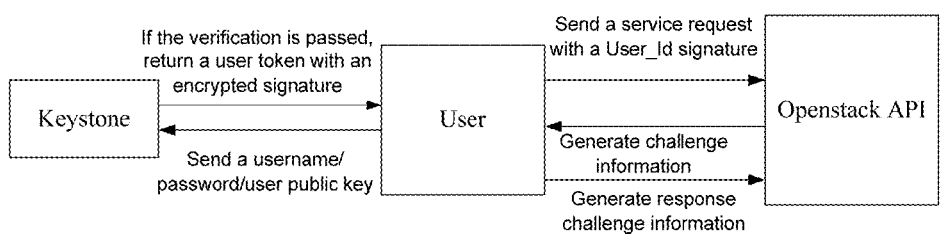
FIG. 6 is a schematic diagram of an identity authentication process of a method for constructing a token for cloud platform resource access control provided in an embodiment of the present application.

The access exposure port in the present step may be an exposure port of the cloud platform, which is accessed by the authentication user via the client, for example, any target exposure port in the foregoing embodiment, that is, after acquiring the encrypted user instruction, the user may send the service request to the access exposure port via the client, so that the processor of the server corresponding to the access exposure port may run the cloud platform API of the access exposure port, so as to acquire the service request of the authentication user for the access exposure port, which is sent by the client. The service request in the present step may include a user ID, such as the user ID of the digital signature in the user token, that is, the user may initiate, by means of the client and by using a User_Id signed by the Keystone, a service request (e.g., a service request with a User_Id signature in FIG. 6) to the OPENSTACK API of the access exposure port.

Step 202: whether the authentication user is valid is verified according to the service request; and in case that the authentication user is valid, proceeding to step 203.

In some embodiments, in the present embodiment, the OPENSTACK API may periodically pull a revocation list from the keystone, and correspondingly, in the present step, the server running the OPENSTACK API may verify whether the user is valid according to the acquired revocation list and the authorization time information in the metadata; if the user is valid, step 203 is executed; and if the user is invalid, corresponding failure information is sent to the client. For example, the OPENSTACK API may verify the User_Id of the signature at first; then verifies whether the user of the User_Id is valid by using the revocation list; next, verifies a validity period of the user according to the authorization time (Expires_at) information in the Merkle tree port data (i.e., the target Merkle tree port data, such as Merkle tree port data with the same User_Id) corresponding to the authentication user in a local memory (e.g., a cache); if the verification is passed, step 203 is executed; and if the verification is not passed, corresponding failure information is sent to the client.

Step 203: challenge information is generated according to the stored target Merkle tree port data, and the challenge information is sent to the client, wherein the target Merkle tree port data is Merkle tree port data, which is stored in the access exposure port and corresponds to the authentication user.

It can be understood that, the objective of the present step may be that the server running the OPENSTACK API of the access exposure port generates the challenge information corresponding to the authentication user by using the Merkle tree port data (i.e., the target Merkle tree port data), which is stored in the OPENSTACK API and corresponds to the authentication user, so as to verify the identity of the authentication user.

In some embodiments, the target Merkle tree port data (OPENSTACK API Merkle Tree Token) in the present step may be Merkle tree port data, which is used for local authentication and is correspondingly stored in the OPENSTACK API of the access exposure port in the exposure port (i.e., the target exposure port) to which the authentication user is authorized to access. When the leaf node in the Merkle tree data corresponding to the authentication user includes a hash value corresponding to the information of each endpoint in the cloud platform, the Merkle tree port data may include leaf nodes (i.e., non-target leaf nodes) corresponding to the information of each endpoint other than the access exposure port in the Merkle tree data corresponding to the authentication user, and data (e.g., the information of each endpoint, the user information, the project information, the role information and the authorization time information) before has encryption is performed on the leaf node (i.e., the target leaf node) other than the non-target leaf nodes in the Merkle tree port data; and as shown in FIG. 4, when the exposure port is Endpoint 2, the Merkle tree port data corresponding to the exposure port may include non-target leaf nodes (Hash35 and Hash37) and metadata (User, Role, Project, Expires_at, Issued_At and Endpoint 2) corresponding to the target leaf node.

Correspondingly, as shown in FIG. 4, the target Merkle tree port data stored in the access exposure port may include a root node (Hash00) of a Merkle tree corresponding to the leaf node in the metadata token, which is not limited in the present embodiment in any way.

Figure 7:
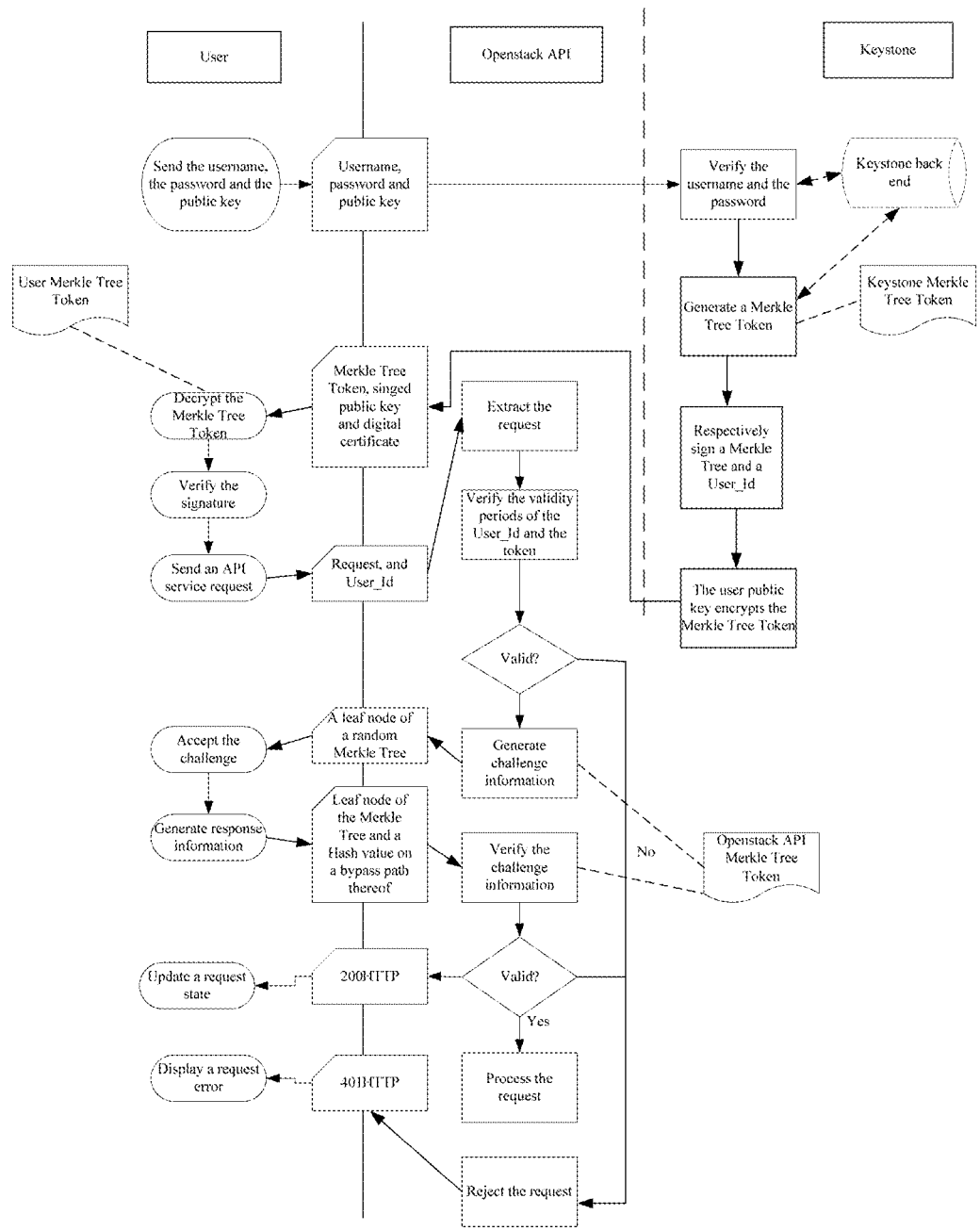
FIG. 7 is a schematic flow diagram of an identity authentication process of a method for constructing a token for cloud platform resource access control provided in an embodiment of the present application.
Figure 8:
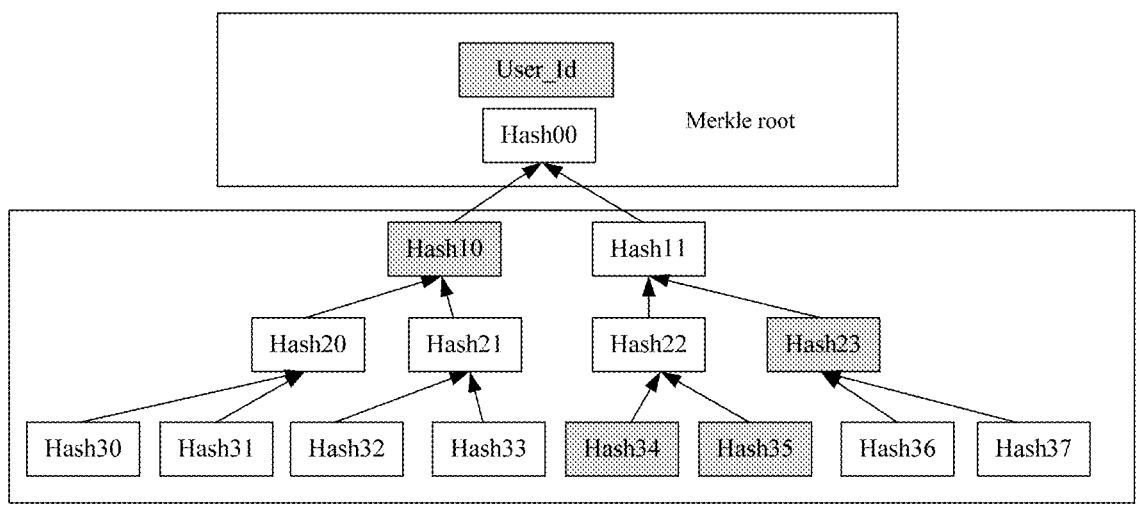
FIG. 8 is a schematic diagram of token response information of a method for constructing a token for cloud platform resource access control provided in an embodiment of the present application.

It should be noted that in the present step, the content of the challenge information that is generated according to the stored target Merkle tree port data may be set by the designer himself/herself, for example, the challenge information may be information, which requires that the token response information returned by the client includes the leaf nodes in all metadata tokens. When the target Merkle tree port data includes the root node of the Merkle tree data corresponding to the authentication user, the challenge information may be challenge information that is generated according to any leaf node (i.e., a challenge leaf node) in the randomly selected Merkle tree data, for example, the challenge information may be information that requires the client to return the User_Id, the challenge leaf node (Hash34 in FIG. 8) and a random bypass node (i.e., a bypass hash value, e.g., Hash35, Hash23 and Hash10 in FIG. 8), which is capable of generating the root node (e.g., Hash00 in FIG. 8) of the Merkle tree data; as shown in FIG. 7, the challenge information may also be information that requires the client to return a response leaf node corresponding to the challenge leaf node, and a hash value on a bypass path thereof, such that an attacker may only intercept some hash values, and thus cannot completely restore the entire authorization metadata token, thereby ensuring the security of the authorization metadata token, wherein the hash value on the bypass path of the response leaf node may be a hash value, which is used for calculating an upper layer node of the Merkle tree data together with the response leaf node, for example, when Hash30 in FIG. 8 is the response leaf node, the hash value on the bypass path of Hash30 may be Hash 31, which is used for calculating Hash20 together with Hash30, which is not limited in the present embodiment in any way.

That is to say, the present step may include: randomly selecting, by the processor, a challenge leaf node according to the target Merkle tree port data, generating challenge information corresponding to the challenge leaf node, and sending the challenge information to the client, so that the client returns token response information, which contains a response leaf node corresponding to the challenge leaf node, and a bypass hash value, wherein the challenge leaf node is any leaf node of the Merkle tree data.

Correspondingly, in the present embodiment, the target Merkle tree port data stored in the access exposure port may include metadata corresponding to the target leaf node, and non-target leaf nodes, so as to avoid metadata leakage of the non-target leaf nodes; and the target Merkle tree port data may also directly store all leaf nodes in the Merkle tree data corresponding to the authentication user or data of all leaf nodes before hash encryption, which is not limited in the present embodiment in any way.

Step 204, verifying token response information returned by the client is verified according to the target Merkle tree port data.

In some embodiments, the objective of the present embodiment may be that the server running the OPEN-STACK API of the access exposure port verifies, by using the Merkle tree port data (i.e., the target Merkle tree port data), which is stored in the OPENSTACK API and corresponds to the authentication user, response information (i.e., the token response information), which is returned by the client and corresponds to the challenge information, so as to determine the identity and authorization of the authentication user.

Correspondingly, before the present step, the method may include a step of receiving, by the client, an OPENSTACK API challenge of the access exposure port, generating the token response information according to the authorization metadata token, and sending the token response information. For example, when the challenge information is information that requires the client to return the response leaf node corresponding to the challenge leaf node, and the bypass hash value, the client may generate, according to the authorization metadata token, token response information, which includes the response leaf node corresponding to the challenge leaf node, and the bypass hash value, and sort the response leaf node and the bypass hash value in the token response information according to the sequence of an OPENSTACK API service node for calculating an Merkle root, and send the token response information to the OPEN-STACK API.

That is to say, before the present step, the client may search, according to the received challenge information sent by the access exposure port and from the authorization metadata token, the response leaf node corresponding to the challenge leaf node; calculate and determine the bypass hash value according to the response leaf node and by using the leaf nodes in the authorization metadata token; and generate the token response information according to the response leaf node and the bypass hash value, and send the token response information to the access exposure port.

It can be understood that, in the present step, the specific manner of the server running the OPENSTACK API of the access exposure port for verifying the token response information returned by the client according to the target Merkle tree port data may set by the designer himself/herself, for example, when the token response information includes the response leaf node and the bypass hash value, in the present step, the server may calculate a response root node according to the response leaf node and the bypass hash value in the token response information, wherein the response leaf node is any leaf node of the Merkle tree data, that is, the response leaf node corresponds to the challenge leaf node, and if the challenge succeeds, the response leaf node is the same as the challenge leaf node; the bypass hash value is a hash value in the Merkle tree data, which corresponds to the response leaf node and is used for calculating the root node, and the bypass hash value includes a hash value (e.g., Hash23 and Hash10 in FIG. 8) of a leaf node that is not the Merkle tree data; the server judges whether the response root node is the same as the root node in the target Merkle tree port data; if so, the server executes step 205; and if not, the server determines that the challenge of the client fails, and refuses to provide a service for the client, as shown in FIG. 7, rejects the present service request and sends request error information to the client.

Step 205, in case that the verification succeeds, a service for the client is provided.

It can be understood that, the objective of the present step may be that the server running the OPENSTACK API of the access exposure port verifies that the token response information successfully passes the verification, that is, after the challenge of the client succeeds, processes the service request of the client, and provides a corresponding service.

In the present embodiment, by means of the using the challenge response solution in the process of the client requesting the service from the cloud platform API of the access exposure port in the embodiments of the present application, the data volume that the client needs to send to the cloud platform API might be reduced, the situation of online communication between the cloud platform API and the component of the identity authentication service is reduced, the communication overheads are reduced, and local authentication of the cloud platform API is realized.

Figure 9:
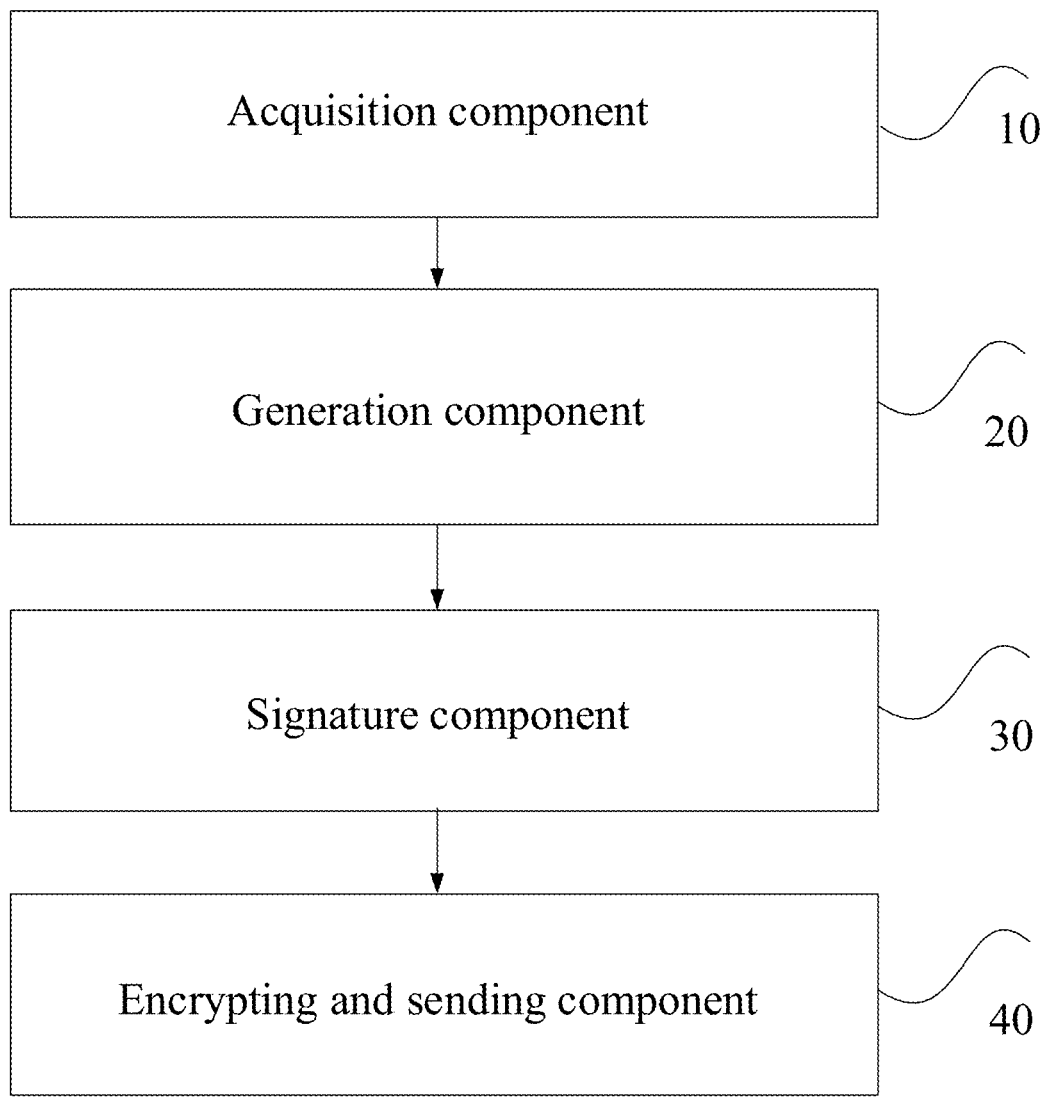
FIG. 9 is a structural block diagram of an apparatus for constructing a token for cloud platform resource access control provided in an embodiment of the present application.

Please refer to FIG. 9, FIG. 9 is a structural block diagram of an apparatus for constructing a token for cloud platform resource access control provided in an embodiment of the present application. The apparatus may include:
  an acquisition component 10, configured to acquire a token application request of an authentication user, wherein the authentication user is a user whose identity authentication succeeds, and the token application request includes a user public key;
  a generation component 20 configured to generate an authorization metadata token corresponding to the authentication user according to the token application request, wherein the authorization metadata token includes a leaf node of Merkle tree data corresponding to the authentication user, and the leaf node includes a hash value corresponding to each piece of access resource authorization information;
  a signature component 30, configured to perform digital signature on the authorization metadata token by using a digital certificate, so as to generate a user token; and
  an encrypting and sending component 40, configured to encrypt the user token by using the user public key, so as to generate an encrypted user token, and send the encrypted user token and the digital certificate to a client of the authentication user, so that the client challenge response of performs resource access by using the authorization metadata token.

In some embodiments, the leaf node includes: hash values corresponding to information of each endpoint in the cloud platform, user information, project information, role information and authorization time information.

In some embodiments, the information of each endpoint, the user information, the project information, the role information and the authorization time information include respective corresponding random numbers.

In some embodiments, the Merkle tree data is a complete binary tree structure with an even number of leaf nodes.

In some embodiments, in case that the token application request includes a username and a password, the generation component 20 may include:
  an authentication sub-component configured to, perform identity authentication on a user corresponding to the token application request according to the username and the password; and
  a generation sub-component configured to, in case that the identity verification succeeds, determine the user corresponding to the token application request to be the authentication user, and generate the authorization metadata token corresponding to the authentication user.

In some embodiments, in case that the authorization metadata token includes a user ID and the leaf node, the signature component 30 may be configured to respectively perform digital signature on the user ID and the leaf node by using the digital certificate, and combine obtained digital signatures to obtain the user token.

In some embodiments, the authorization metadata token includes target data in the Merkle tree data; and the target data only includes the leaf node, and the target data is less than or equal to 1 KB.

In some embodiments, the apparatus may include:
  a port data generation component configured to generate Merkle tree port data corresponding to each target exposure port according to the Merkle tree data, wherein the target exposure port is an exposure port in the cloud platform to which the authentication user is authorized to access; and
  a port data storage component, configured to send the Merkle tree port data to the corresponding target exposure port for storage.

In some embodiments, in case that the leaf node includes hash value corresponding to information of each endpoint in the cloud platform, the Merkle tree port data includes metadata corresponding to a target leaf node, and non-target leaf nodes, the non-target leaf nodes and the target leaf node form all leaf nodes of the Merkle tree data, the non-target leaf node is a leaf node corresponding to the information of each endpoint other than the corresponding target exposure port in the Merkle tree data, and the metadata is data before hash encryption is performed on the target leaf node in the Merkle tree data.

In some embodiments, the apparatus may include:
  a service acquisition component, configured to acquire a service request of the authentication user for an access exposure port, which is sent by the client, wherein the access exposure port is an exposure port that receives the service request;
  a verification component configured to verify whether the authentication user is valid according to the service request;
  a challenge component configured to, in case that the authentication user is valid, generate challenge information according to the stored target Merkle tree port data, and send the challenge information to the client, wherein the target Merkle tree port data is Merkle tree port data, which is stored in the access exposure port and corresponds to the authentication user;
  a challenge verification component configured to, according to the target Merkle tree port data, verify token response information returned by the client; and
  a service component configured to, in case that the verification succeeds, provide a service for the client by means of the access exposure port.

In some embodiments, in case that the metadata token includes a user ID, the verification component may include:
  an ID acquisition sub-component, configured to acquire the user ID according to a digital signature of the user ID in the service request; and
  a verification sub-component, configured to verify whether the user is valid according to an acquired revocation list and a authorization time information in the metadata; and in case that the authentication user is valid, send a starting signal to the challenge component.

In some embodiments, the challenge component may be configured to randomly select a challenge leaf node according to the target Merkle tree port data, generate challenge information corresponding to the challenge leaf node, and send the challenge information to the client, wherein the challenge leaf node is any leaf node of the Merkle tree data.

In some embodiments, in case that the target Merkle tree port data includes a root node of a Merkle tree, the challenge verification component may include:

a calculation sub-component, configured to calculate a response root node according to a response leaf node and a bypass hash value in the token response information, wherein the response leaf node is any leaf node of the Merkle tree data, the response leaf node corresponds to the challenge leaf node, the bypass hash value is a hash value in the Merkle tree data, which corresponds to the response leaf node and is used for calculating the root node, and the bypass hash value includes a hash value of a leaf node that is not the Merkle tree data; and a root node judging sub-component, configured to judge whether the response root node is the same as the root node; and in case that the response root node is the same as the root node, send a starting signal to the service component.

In the present embodiment, by means of setting the authorization metadata token, the encrypted user token, which is sent to the user whose identity authentication succeeds, only needs to contain access resource authorization information required by the service request, so that the length of the token metadata is greatly reduced on the premise of guaranteeing that the information of the token is complete enough, and thus the cloud platform API may perform local authentication by using the content corresponding to the stored token; and moreover, the user token is encrypted by using the user public key, so as to generate the encrypted user token, thereby ensuring the security of token transmission. In addition, the present application provide an apparatus and device for constructing a token for cloud platform resource access control, which also have the above beneficial effects.

Please refer to FIG. 10, FIG. 10 is a schematic structural diagram of a device for constructing a token for cloud platform resource access control provided in an embodiment of the present application. The device 1 may include:

a memory 11, used for storing a computer program; and
a processor 12 used for, when executing the computer program, implementing the steps of the method for constructing the token for cloud platform resource access control as described in the above embodiments.

The device 1 may include a memory 11, a processor 12 and a bus 13.

The memory 11 includes at least one type of readable storage medium, and the readable storage medium includes a flash memory, a hard disk, a multimedia card, a card-type memory (for example, an SD or DX memory, and the like), a magnetic memory, a magnetic disk, an optical disk, and the like. The memory 11 may be an internal storage unit of the device 1 in some embodiments. In some other embodiments, the memory 11 may also be an external storage device of the device 1, for example, a plug-in hard disk, a smart media card (Smart Media Card, SMC), a secure digital (Secure Digital, SD) card, a flash card (Flash Card) and the like, which are provided on a server. In some embodiments, the memory 11 may include both the internal storage unit of the device 1 and the external storage device. The memory 11 may not only be used for storing application software and various data installed in the device 1, for example, codes of a program for executing the method for constructing the token for cloud platform resource access control, and the like, but may also be used for temporarily storing data that has been output or is about to be output.

In some embodiments, the processor 12 may be a central processing unit (Central Processing Unit, CPU), a controller, a micro-controller, a microprocessor or other data processing chips, and is used for running program codes or process data stored in the memory 11, for example, codes of the program for executing the method for constructing the token for cloud platform resource access control, etc.

The bus 13 may be a peripheral component interconnect (peripheral component interconnect, PCI for short) bus or an extended industry standard architecture (extended industry standard architecture, EISA for short) bus, etc. The bus may be divided into an address bus, a data bus, a control bus, and the like. For ease of representation, only one thick line is used to represent the bus in FIG. 10, but it does not mean that there is only one bus or one type of buses.

In some embodiments, the device may include a network interface 14, and the network interface 14 may include a wired interface and/or a wireless interface (e.g., a Wi-Fi interface, a Bluetooth interface, and the like), and is generally used for establishing a communication connection between the device 1 and other electronic devices.

In some embodiments, the device 1 may include a user interface 15, the user interface 15 may include a display (Display), an input unit such as a key, and In some embodiments, the user interface 15 may include a standard wired interface and a standard wireless interface. In some embodiments, the display may be an LED display, a liquid crystal display, a touch-control liquid crystal display, an OLED (Organic Light-Emitting Diode, OLED) touch device, etc. The display may also be suitably referred to as a display screen or a display unit, which is used for displaying information processed in the device 1 and displaying a visual user interface.

FIG. 10 only shows the device 1 with components 11-15, it can be understood by those skilled in the art that the structure shown in FIG. 10 does not constitute a limitation to the device 1, and the device may include fewer or more components than those illustrated, or combine some components or have different component arrangements.

In addition, the embodiments of the present application disclose a computer-readable storage medium, wherein a computer program is stored on the computer-readable storage medium, and when executed by a processor, the computer program implements the steps of the method for constructing the token for cloud platform resource access control provided in the above embodiments.

The readable storage medium may be various readable storage media capable of storing program codes, such as a USB flash disk, a mobile hard disk, a read-only memory (Read-Only Memory, ROM), a random access memory (Random Access Memory, RAM), a magnetic disk, or an optical disk, etc.

Various embodiments in the specification are described in a progressive manner, each embodiment focuses on the difference from other embodiments, and the same and similar parts between the various embodiments refer to each other. Since the apparatus, the device and the computer-readable storage medium disclosed in the embodiments correspond to the method disclosed in the embodiments, the description is relatively simple, and the related parts refer to the description of the method.

The method, apparatus and device for constructing the token for cloud platform resource access control, and the computer-readable storage medium provided by the present application have been described in detail above. Specific examples are used herein to describe the principles and embodiments of the present application, and the description of the above embodiments is merely used to help understand the method of the present application and the core ideas thereof. It should be noted that, for those ordinary skilled in the art, several improvements and modifications may be made to the present application without departing from the principles of the present application, and these improvements and modifications also fall within the protection scope of the claims of the present application.

What is claimed is:

1. A method for constructing a token for cloud platform resource access control, comprising:
    acquiring a token application request of an authentication user by a processor in a device running an identity authentication service in the cloud platform, wherein the authentication user is a user whose identity authentication succeeds, and the token application request comprises a user public key;
    generating an authorization metadata token corresponding to the authentication user by the processor according to the token application request, wherein the authorization metadata token comprises a leaf node of Merkle tree data corresponding to the authentication user, and the leaf node comprises a hash value corresponding to pieces of access resource authorization information;
    performing digital signature on the authorization metadata token by the processor by using a digital certificate, so as to generate a user token; and
    encrypting the user token by the processor by using the user public key, so as to generate an encrypted user token, and sending the encrypted user token and the digital certificate to a client of the authentication user, so that the client performs challenge response of resource access by using the authorization metadata token;
    generating Merkle tree port data corresponding to each target exposure port by the processor according to the Merkle tree data, wherein the target exposure port is an exposure port in the cloud platform to which the authentication user is authorized to access; and
    sending the Merkle tree port data to the corresponding target exposure port for storage by the processor resulting in stored target Merkle tree port data;
    acquiring a service request of the authentication user for an access exposure port by a server running an API for accessing an exposure port in the cloud platform, which is sent by the client, wherein the access exposure port is an exposure port that receives the service request, and different services have different corresponding exposure ports;
    verifying whether the authentication user is valid by the server according to the service request;
    in response to the authentication user being valid, generating challenge information by the server according to the stored target Merkle tree port data, and sending the challenge information to the client by the server, wherein the target Merkle tree port data is Merkle tree port data, which is stored in the access exposure port and corresponds to the authentication user;
    according to the target Merkle tree port data, executing a verification of token response information returned by the client by the server; and
    in response to the verification succeeding, providing a service for the client by means of the access exposure port by the server.

2. The method for constructing the token for cloud platform resource access control according to claim 1, wherein the leaf node comprises: hash values corresponding to information of each endpoint in the cloud platform, user information, project information, role information and authorization time information.

3. The method for constructing the token for cloud platform resource access control according to claim 2, wherein the information of each endpoint, the user information, the project information, the role information and the authorization time information comprise respective corresponding random numbers.

4. The method for constructing the token for cloud platform resource access control according to claim 1, wherein the Merkle tree data is a complete binary tree structure with an even number of leaf nodes.

5. The method for constructing the token for cloud platform resource access control according to claim 1, wherein when the token application request comprises a username and a password, the step of according to the token application request, generating the authorization metadata token corresponding to the authentication user according to the token application request by the processor comprises:
    performing identity authentication on a user corresponding to the token application request according to the username and the password; and
    in response to the identity verification succeeding, determining the user corresponding to the token application request to be the authentication user, and generating the authorization metadata token corresponding to the authentication user.

6. The method for constructing the token for cloud platform resource access control according to claim 1, wherein when the authorization metadata token comprises a user ID and the leaf node, the step of performing digital signature on the authorization metadata token by using the digital certificate by the processor, so as to generate the user token comprises:
    respectively performing digital signature on the user ID and the leaf node by using the digital certificate, and combining obtained digital signatures to obtain the user token.

7. The method for constructing the token for cloud platform resource access control according to claim 1, wherein the authorization metadata token comprises target data in the Merkle tree data; and the target data comprises the leaf node, and the target data is less than or equal to 1 KB.

8. The method for constructing the token for cloud platform resource access control according to claim 1, wherein when the leaf node comprises hash value corresponding to information of each endpoint in the cloud platform, the Merkle tree port data comprises metadata corresponding to a target leaf node, and non-target leaf nodes, the non-target leaf nodes and the target leaf node form all leaf nodes of the Merkle tree data, the non-target leaf node is a leaf node corresponding to the information of each endpoint other than the corresponding target exposure port in the Merkle tree data, and the metadata is data before hash encryption is performed on the target leaf node in the Merkle tree data.

9. The method for constructing the token for cloud platform resource access control according to claim 1, wherein when the metadata token comprises a user ID, the step of according to the service request, verifying whether the authentication user is valid comprises:
   acquiring the user ID according to a digital signature of the user ID in the service request;
   verifying whether the user is valid according to an acquired revocation list and a authorization time information in the metadata; and
   in response to the authentication user being valid, executing the step of generating the challenge information according to the stored target Merkle tree port data, and sending the challenge information to the client.

10. The method for constructing the token for cloud platform resource access control according to claim 1, wherein the step of generating the challenge information according to the stored target Merkle tree port data by the server, and sending the challenge information to the client by the server comprises:
   randomly selecting a challenge leaf node according to the target Merkle tree port data, generating challenge information corresponding to the challenge leaf node, and sending the challenge information to the client, wherein the challenge leaf node is any leaf node of the Merkle tree data.

11. The method for constructing the token for cloud platform resource access control according to claim 10, wherein when the target Merkle tree port data comprises a root node of the Merkle tree data, the step: according to the target Merkle tree port data, verifying the token response information returned by the client by the server, comprises:
   calculating a response root node according to a response leaf node and a bypass hash value in the token response information, wherein the response leaf node is any leaf node of the Merkle tree data, the response leaf node corresponds to the challenge leaf node, the bypass hash value is a hash value in the Merkle tree data, which corresponds to the response leaf node and is used for calculating the root node, and the bypass hash value comprises a hash value of a leaf node that is not the Merkle tree data;
   judging whether the response root node is the same as the root node; and
   in response to the response root node being the same as the root node, executing the step of providing the service for the client.

12. The method for constructing the token for cloud platform resource access control according to claim 11, wherein before the step of calculating the response root node according to the response leaf node and the bypass hash value in the token response information, the method comprises:
   searching the response leaf node from the authorization metadata token according to the received challenge information by the client;
   calculating and determining the bypass hash value according to the response leaf node and by using the leaf node in the authorization metadata token; and
   generating the token response information according to the response leaf node and the bypass hash value, and sending the token response information to the access exposure port.

13. The method for constructing the token for cloud platform resource access control according to claim 1, wherein the cloud platform manages and maintains an exposure port of each service, and the client uses the exposure port to send service requests to the cloud platform.

14. The method for constructing the token for cloud platform resource access control according to claim 1, wherein the step of generating the challenge information according to the stored target Merkle tree port data, and sending the challenge information to the client by the server comprises:
   running server for accessing the API of the cloud platform of the exposure port, and generating the challenge information corresponding to the authenticated user by using the Merkle tree port data corresponding to the authenticated user stored by the API of the cloud platform, to verify the identity of the authenticated user.

15. The method for constructing the token for cloud platform resource access control according to claim 1, wherein the user public key is randomly generated by the client after obtaining an user name and password entered by the authenticated user.

16. The method for constructing the token for cloud platform resource access control according to claim 1, wherein the leaf nodes of the Merkle tree data in the authorization metadata token are disordered.

17. A device for constructing a token for cloud platform resource access control, comprising:
   a memory, configured to store a computer program; and
   a processor configured to, in response to executing the computer program, implementing the following actions:
   acquiring a token application request of an authentication user, wherein the authentication user is a user whose identity authentication succeeds, and the token application request comprises a user public key;
   generating an authorization metadata token corresponding to the authentication user according to the token application request, wherein the authorization metadata token comprises a leaf node of Merkle tree data corresponding to the authentication user, and the leaf node comprises a hash value corresponding to pieces of access resource authorization information;
   performing digital signature on the authorization metadata token by using a digital certificate, so as to generate a user token; and
   encrypting the user token by using the user public key, so as to generate an encrypted user token, and sending the encrypted user token and the digital certificate to a client of the authentication user, so that the client performs challenge response of resource access by using the authorization metadata token;
   generating Merkle tree port data corresponding to each target exposure port according to the Merkle tree data, wherein the target exposure port is an exposure port in the cloud platform to which the authentication user is authorized to access; and
   sending the Merkle tree port data to the corresponding target exposure port for storage resulting in stored target Merkle tree port data;
   acquiring a service request of the authentication user for an access exposure port, which is sent by the client, wherein the access exposure port is an exposure port that receives the service request, and different services have different corresponding exposure ports;
   verifying whether the authentication user is valid according to the service request;
   in response to the authentication user being valid, generating challenge information according to the stored target Merkle tree port data, and sending the challenge information to the client, wherein the target Merkle tree port data is Merkle tree port data, which is stored in the access exposure port and corresponds to the authentication user;

according to the target Merkle tree port data, executing a verification of token response information returned by the client; and in response to the verification succeeding, providing a service for the client by means of the access exposure port.

18. A non-transitory storage medium, wherein a computer program is stored on the non-transitory storage medium, in response to execution of the computer program, implements the following actions:

acquiring a token application request of an authentication user, wherein the authentication user is a user whose identity authentication succeeds, and the token application request comprises a user public key;

generating an authorization metadata token corresponding to the authentication user according to the token application request, wherein the authorization metadata token comprises a leaf node of Merkle tree data corresponding to the authentication user, and the leaf node comprises a hash value corresponding to pieces of access resource authorization information;

performing digital signature on the authorization metadata token by using a digital certificate, so as to generate a user token; and encrypting the user token by using the user public key, so as to generate an encrypted user token, and sending the encrypted user token and the digital certificate to a client of the authentication user, so that the client performs challenge response of resource access by using the authorization metadata token;

generating Merkle tree port data corresponding to each target exposure port according to the Merkle tree data, wherein the target exposure port is an exposure port in the cloud platform to which the authentication user is authorized to access; and sending the Merkle tree port data to the corresponding target exposure port for storage resulting in stored target Merkle tree port data;

acquiring a service request of the authentication user for an access exposure port, which is sent by the client, wherein the access exposure port is an exposure port that receives the service request, and different services have different corresponding exposure ports;

verifying whether the authentication user is valid according to the service request;

in response to the authentication user being valid, generating challenge information according to the stored target Merkle tree port data, and sending the challenge information to the client, wherein the target Merkle tree port data is Merkle tree port data, which is stored in the access exposure port and corresponds to the authentication user;

according to the target Merkle tree port data, executing a verification of token response information returned by the client; and in response to the verification succeeding, providing a service for the client by means of the access exposure port.

\* \* \* \* \*